United States Patent

Walters et al.

[11] Patent Number: 5,933,974
[45] Date of Patent: Aug. 10, 1999

[54] COMBINATION SQUARE, LEVEL AND PLUMBING TOOL

[76] Inventors: Larry R. Walters, 12056 W. Brandt Pl., Littleton, Colo. 80127; Tim Balas, 1783 E. Ada Dr., Aurora, Colo. 80017

[21] Appl. No.: 08/864,102

[22] Filed: May 28, 1997

[51] Int. Cl.⁶ .............................. G01C 9/16; G01C 9/24
[52] U.S. Cl. ............................... 33/474; 33/404; 33/451; 33/392
[58] Field of Search ........................... 33/474, 404, 423, 33/424, 429, 451, 480, 392

[56] References Cited

U.S. PATENT DOCUMENTS

| | | | |
|---|---|---|---|
| 885,076 | 4/1908 | Olson | 33/404 |
| 2,343,688 | 3/1944 | Maxey | 33/392 |
| 2,627,124 | 2/1953 | Rock | 33/392 |
| 2,794,263 | 6/1957 | Cranmer | 33/392 |
| 4,404,753 | 9/1983 | Klok | 33/474 |

*Primary Examiner*—Christopher W. Fulton
*Attorney, Agent, or Firm*—Douglass F. Vincent

[57] ABSTRACT

A carpenter's square having a first and second leg at right angles to each other, and a third leg extending between the first and second legs. A magnetic strip on the first leg for attaching the tool to a metallic surface to be plumbed. A first notch in the third leg a first distance from the first leg and a second notch in the third leg a second distance from the first leg so that a plumb string can be threaded through the first and second notches and thereby held in place to support a plumb bob to allow a plumb reading to be taken without the need for manually supporting the plumb bob.

5 Claims, 2 Drawing Sheets

COMBINATION SQUARE, LEVEL AND PLUMBING TOOL

TECHNICAL FIELD

This invention relates to measuring instruments and, more particularly, to a tool for leveling, squaring and plumbing any individual or interconnected objects of any shape for use by builders, carpenters, plumbers, machinists and the like.

BACKGROUND ART

The typical carpenter's square has been well known for many years and is a very necessary and useful tool in most fields of construction. Hardly anyone, whether a professional carpenter or craftsman, or mere amateur do-it-yourself home builder, has ever done any woodworking without having had to employ a square at one time or another. The square is the only convenient tool for assuring that two pieces of material have been fitted together exactly perpendicularly to each other, or that a single piece of material has adjacent edges which meet at a right angle. As is well known in many forms of professional or home workshop construction, it is most critical that complementary pieces of material fit together at a right angle, or that individual pieces have adjacent edges which meet at a right angle, in order for the finished product to be properly constructed in terms of rigidity, strength and aesthetic appearance. Tight tolerances are the rule, rather than the exception when dealing with this kind of work.

Although the basic configuration of the carpenter's square has remained unchanged since the square was first developed, many improvements have been made which have substantially increased the efficient utilization of the square, as a result of which many different types of squares exist today. For example, the professional carpenter's square is still nothing more than a single piece of metal formed in the shape of an "L", that is, two legs joined to each other at a 90° angle, each leg having markings thereon to indicate increments of linear measurement. Typically, the legs of this type of square are unequal and between 1 and 2 feet long since the square is used where the pieces of material have large dimensions, such as in the construction of a house. A smaller, more portable square, suitable for carrying on a tool belt and commonly known as a "speed square", is favored by many craftsmen.

It is well known that carpenter's and other skilled workmen prefer to carry and use a minimum number of tools. Since a carpenter's square is an essential tool, numerous attempts have been made to improve the tool, often by combining the square with other tools or by adding features to the square. U.S. Pat. No. 3,499,225 to Darrah, for example, provides a 2-piece hinged square with a horizontal level built into the tool. The tool includes a substantially V-shaped portion for fitting closely with a pipe or other member of circular cross-section, with magnets for attaching the tool to the pipe. The tool is designed primarily for ironworking, however, and does not address the recurring carpenter's problem of using a plumb bob to check corners which have been squared using the tool itself.

U.S. Pat. No. 3,826,013 to Baher combines level, square, and plumb functions in one tool. However, Baher achieves its plumb readings indirectly by reading a horizontal bubble level held on an arm at right angles to the surface being plumbed. Such a reading would be likely to produce inaccuracies over distances greater than a few feet, when compared to equivalent plumb readings obtained by use of a plumb bob. Various other inventions have combined levels with squares, either as a way to achieve a plumb reading, or simply to add a level function, or as a combination of both. U.S. Pat. No. 4,503,624 to Whiteford combines a level with a square, with the intent of achieving a plumb reading. However, Whiteford suffers from the same inaccuracy drawbacks as Baher. U.S. Pat. No. 5,253,426 to Mosbrucker is similar in concept to Whiteford and Baher, and suffers from the same inaccuracy drawback.

U.S. Pat. No. 5,269,066 to Walters illustrates an attempt to solve the accuracy problems of Whiteford, Baher, and Mosbrucker. Walters utilizes a square having full-length level bubbles contained in its legs. By combining full-length bubbles with long legs—the square of Walters' FIG. 1 is 16×24 inches—Walters is presumably able to provide much more accurate plumb readings. However the Walters square is not a convenient size for a carpenter to carry on his tool belt. Moreover, it is still not certain that the plumb readings of Walters would be as accurate as those obtained using a conventional plumb bob. A further attempt to solve the above-mentioned accuracy problems may be found in U.S. Pat. No. 5,239,761 to Wu, et al. Wu combines a square with an actual built-in plumb bob to allow for accurate plumb readings. However, the tool of Wu suffers from the drawback of not providing a no-hands means for fixing the plumb bob in place. Therefore, taking plumb bob readings remains a two-man job with the Wu tool. In an attempt to solve this problem, magnets have been used to free the hands of the user of various tools. For example, U.S. Pat. No. 4,593,475 to Mayes provides a level with magnetic support.

Despite all the attempts to improve on conventional squares by adding levels and plumb reading capabilities, there still remains a need for a convenient, highly portable tool which can accurately perform all the squaring, levelling, and plumb-reading functions which are repeatedly encountered in a variety of carpentry and other tasks. In addition, it would be ideal if such a tool were operable by a single workman. A tool which could accomplish the foregoing would take the place of several tools, and would allow a single workman to perform tasks which normally require at least two workmen to perform.

DISCLOSURE OF THE INVENTION

In accordance with this invention a combination tool for squaring, leveling, and determining plumb is provided. The tool includes a carpenter's square having a first and a second leg at right angles to one another, and a third leg extending between the first and second legs. A magnetic strip of sufficient strength to magnetically support the tool is provided along the first leg. optionally, a second magnetic strip could also be provided along the second leg.

A notch is located in the third leg, a pre-determined distance from the outer surface of the magnetic strip. When the tool is attached to a metal surface, the notch is therefore also a pre-determined distance from that metal surface. A second notch is also provided in the third leg.

In operation, the tool is first magnetically attached to a metal surface, typically the surface to be plumbed. A plumb bob string is then threaded through the first notch and also through the second notch. Typically, the plumb bob string will have a string reel at one end and a plumb bob at the other. When the string has been threaded as described, the plumb bob will be supported by the tool without the user having to manually support the plumb bob or tool in any way. Since the notch from which the plumb bob is hung is a pre-determined distance from the metal surface, the user has a set distance against which to check the plumb of the surface. optionally, a level bubble may be provided in the first or second leg, to further aid in leveling and checking plumb. Additionally a second level bubble may also be provided in the other leg, for further utility. Finally, a second magnetic strip could be provided, and the second notch could also be set a predetermined distance from the outer surface of that magnetic strip, or of the first strip, to allow the tool to be conveniently reversible in use.

In view of the foregoing, several advantages of the present invention are readily apparent. A combination tool is provided which is highly portable and which combines several useful functions in a single tool. The tool may be used in the same manner as any carpenter's square. Additionally, it may be used to check plumb readings. In checking plumb readings, hands-free operation of the tool allows its convenient use by a single user. Optional level bubbles further allow the tool to be used to check level readings.

Additional advantages of this invention will become apparent from the description which follows, taken in conjunction with the accompanying drawings.

BEST MODE FOR CARRYING OUT THE INVENTION

Figure 1:
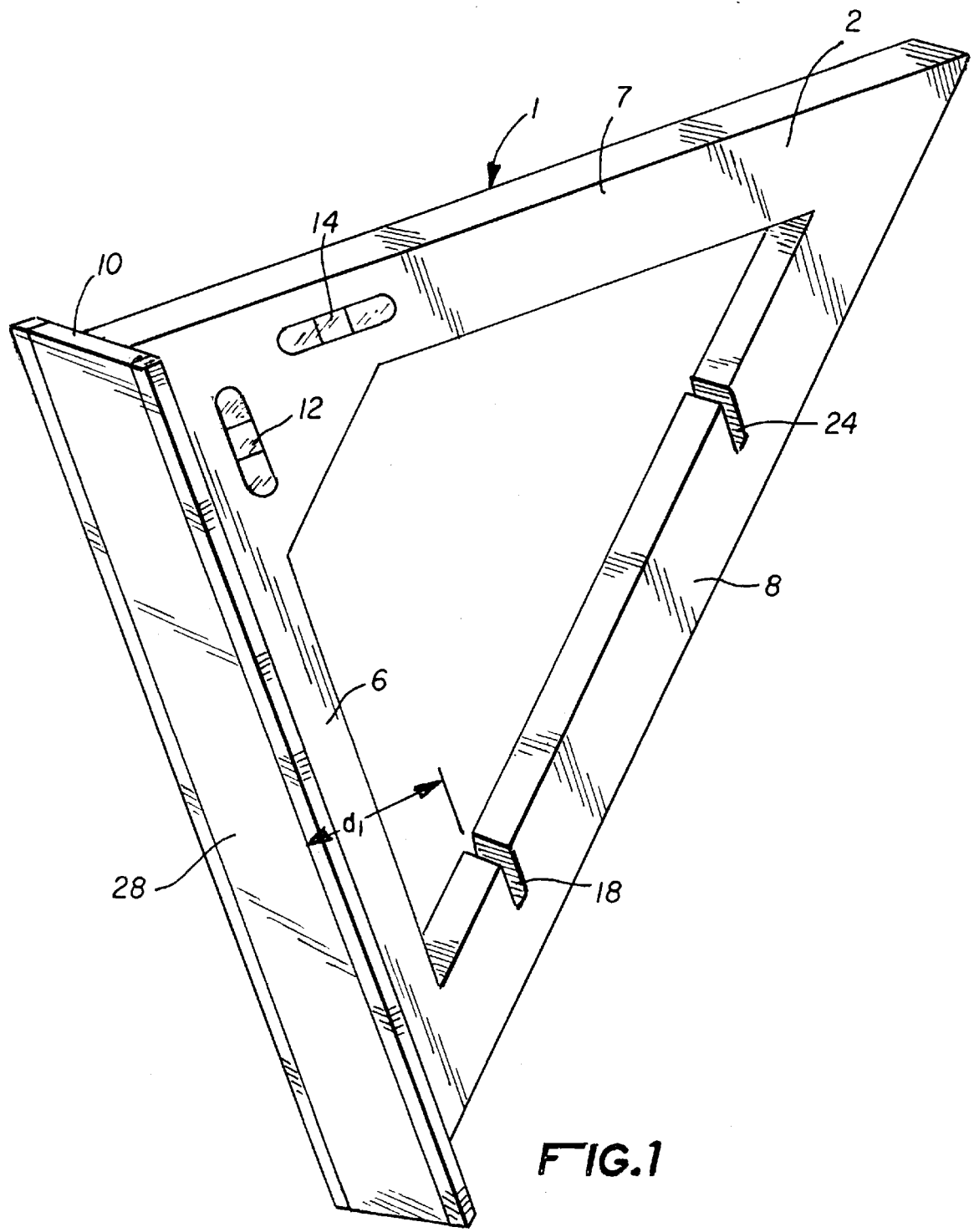
FIG. 1 is a perspective view of the tool of the present invention, showing all relevant parts.
Figure 2:
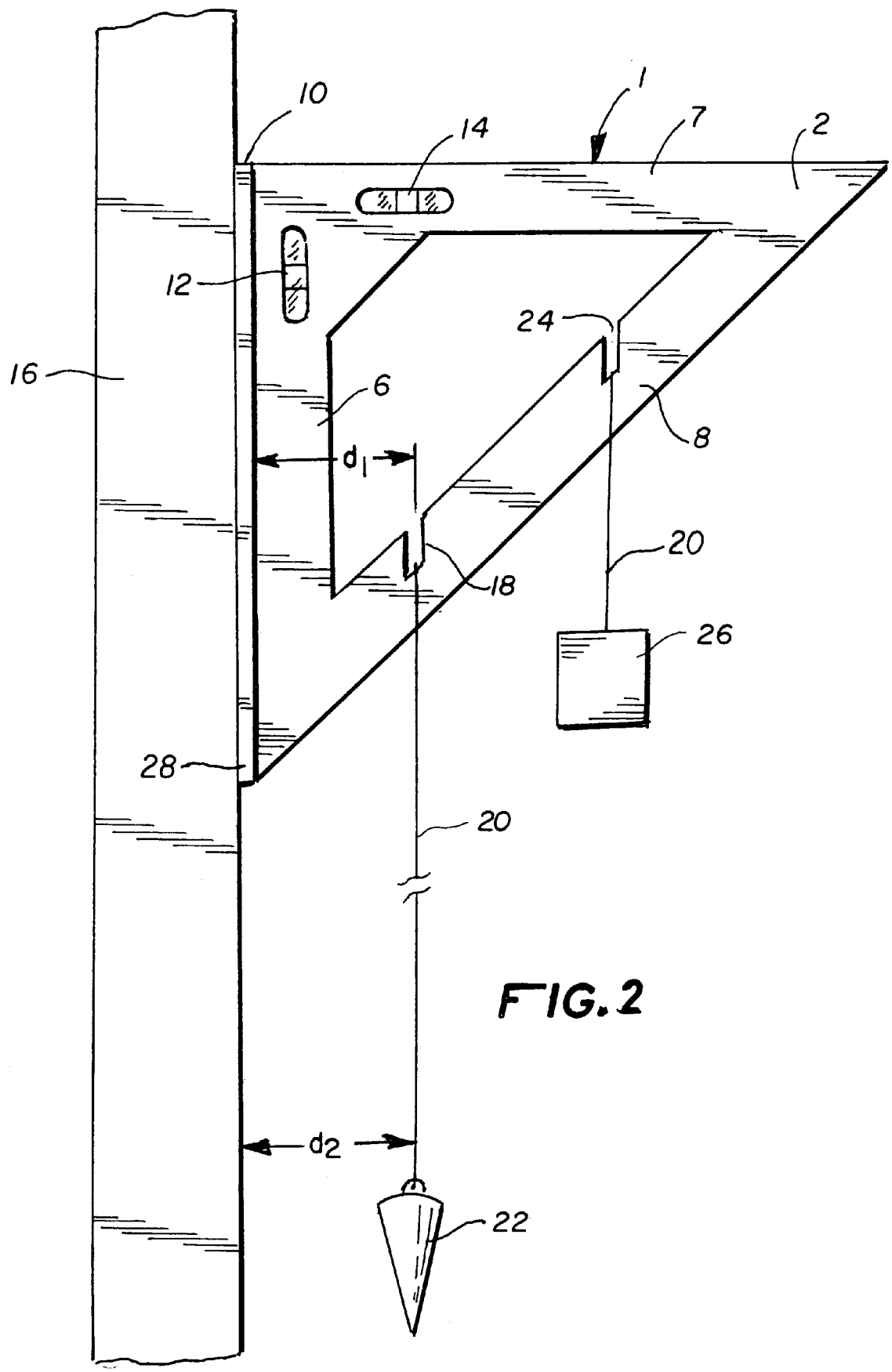
FIG. 2 is an illustration of the tool of FIG. 1 in use, with the tool magnetically attached to a surface and with a plumb bob suspended from the tool.

Referring now to the drawings, there is depicted in FIGS. 1 and 2 a combined square, level and plumb tool 1 according to the present invention. The tool 1 includes a carpenter's square 2, preferably of the type commonly known as a "speed square." A speed square is a square which is of a size which may be conveniently carried on a tool belt, and which is typically used for a variety of squaring jobs, such as squaring beams, frames, and the like. The square 2 has two legs 6,7 set at right angles to one another, and a third leg 8 extending between the first two legs 6,7. A magnetic strip 10 is provided along either one of the legs 6,7, in this illustration along leg 6. This strip 10 is of sufficient magnetic strength to allow the tool 1 to be magnetically attached to a metal surface, thereby allowing hands-free use of the tool 1.

Vertical level bubble 12 and horizontal level bubble 14 are optimally provided so that the tool 1 may also perform levelling operations. Having both a vertical level bubble 12 and a horizontal bubble 14 allows the tool 1 to be conveniently used in a much wider range of possible orientations.

Referring now to FIG. 2, use of the tool 1 for reading the plumb of metal member 16 is depicted. The tool 1 has been attached magnetically to the member 16 by magnetic strip 10, thereby allowing for hands-free use of the tool. A first plumb bob notch 18 is provided in leg 8 for receiving the string 20 from plumb bob 22. The string 20 is then also threaded through a second notch 24, and the plumb bob string reel 26 may then be suspended from the tool 1. Notch 18 is a pre-set distance $d_1$ from the outer surface 28 of magnetic strip 10. Knowing this distance $d_1$, the plumb of the member 16 may then be checked by measuring the distance $d_2$ from the member 16 to the plumb bob string 20. If the two distances are equal, then the member 16 has been determined to be perfectly vertical. If the distances are not equal, then necessary adjustments are indicated by the variance between the two distances.

Optionally, second notch 24 could also be set at a predetermined distance from surface 28 of magnetic strip 10, so that either the first or second notch could be used to measure plumb. Additionally, a second magnetic strip could also be added along leg 7, thereby allowing the tool 1 to be used in additional orientation. In practice, however, the tool 1 will generally be symmetrical so that it may be reversed and used, for example, on a workpiece surface which is either to the user's right or to the user's left.

This invention has been described in detail with reference to a particular embodiment thereof, but it will be understood that various other modifications can be effected within the spirit and scope of this invention.

We claim:

1. A tool for squaring, levelling, and determining plumb, comprising:

a carpenter's square having a first and second leg at right angles to one another, and a third leg extending between said first and second legs;

a magnetic strip along said first leg, for magnetically attaching the tool to a metal surface to be plumbed;

a first notch in said third leg, said notch being located a pre-determined distance from said metal surface when the tool is attached thereto; and a second notch in said third leg, said second notch being spaced from said first notch, so that a plumb bob string may be threaded through said first and second notches and thereby held in place to support a plumb bob, to allow a plumb reading to be taken without the need for manually supporting the plumb bob.

2. A tool as claimed in claim 1, further including:

a level bubble in the first leg of the square.

3. A tool as claimed in claim 2, further including:

a second level bubble in the second leg of the square.

4. A tool as claimed in claim 1, further including:

a second magnetic strip along said second leg, for magnetically attaching the tool to a metal surface to be plumbed.

5. A tool as claimed in claim 4, further including:

a level bubble in the first leg of the square; and a second level bubble in the second leg of the square.

* * * * *